United States Patent
Nakashima (10) Patent No.: US 7,541,945 B2
(45) Date of Patent: Jun. 2, 2009

(54) NAVIGATION SYSTEM AND LANDMARK HIGHLIGHTING METHOD

(75) Inventor: Yasuo Nakashima, Hekinan (JP)

(73) Assignee: DENSO CORPORATION, Kariya (JP)

( * ) Notice: Subject to any disclaimer, the term of this patent is extended or adjusted under 35 U.S.C. 154(b) by 308 days.

(21) Appl. No.: 11/598,645

(22) Filed: Nov. 14, 2006

(65) Prior Publication Data
US 2007/0115142 A1  May 24, 2007

(30) Foreign Application Priority Data
Nov. 16, 2005  (JP) ............................. 2005-331311

(51) Int. Cl.
G08G 1/123 (2006.01)
(52) U.S. Cl. .................. 340/995.24; 340/995.23; 340/995.12; 340/990; 701/202; 701/211
(58) Field of Classification Search ......... 340/995.24, 340/995.23, 995.19, 995.14, 995.12, 995.16, 340/995.15, 995.26, 990, 995.1; 701/202, 701/211
See application file for complete search history.

(56) References Cited

U.S. PATENT DOCUMENTS

| | | | | |
|---|---|---|---|---|
| 5,848,373 A | * | 12/1998 | DeLorme et al. | 701/200 |
| 6,091,956 A | * | 7/2000 | Hollenberg | 455/456.5 |
| 6,144,318 A | * | 11/2000 | Hayashi et al. | 340/995.19 |
| 6,393,479 B1 | * | 5/2002 | Glommen et al. | 709/224 |
| 6,694,252 B2 | * | 2/2004 | Ukita | 701/205 |
| 7,088,266 B2 | * | 8/2006 | Watanabe et al. | 340/995.1 |
| 7,264,157 B2 | * | 9/2007 | Ishizuka | 235/383 |
| 2006/0069503 A1 | * | 3/2006 | Suomela et al. | 701/211 |

FOREIGN PATENT DOCUMENTS

| JP | A-11-160088 | 6/1999 |
|---|---|---|
| JP | A-2003-097966 | 4/2003 |
| JP | A-2004-347634 | 12/2004 |

* cited by examiner

*Primary Examiner*—Benjamin C Lee
*Assistant Examiner*—Daniel Previl
(74) *Attorney, Agent, or Firm*—Posz Law Group, PLC (57) ABSTRACT

A control circuit memorizes identification information of a landmark and a visits count relative to a spot assigned the landmark, in a visits count storing unit. The control circuit updates the visits count stored in the visits count storing unit when the spot assigned the landmark is visited. When a certain landmark becomes included in a map display range on a display unit, the control circuit refers to the visits count storing unit to determine whether a visits count relative to the certain landmark is greater than a predetermined count. The certain landmark is highlighted on the map when the visits count is determined to be greater than the predetermined count.

4 Claims, 8 Drawing Sheets

NAVIGATION SYSTEM AND LANDMARK HIGHLIGHTING METHOD

CROSS REFERENCE TO RELATED APPLICATION

This application is based on and incorporates herein by reference Japanese Patent Application No. 2005-331311 filed on Nov. 16, 2005.

FIELD OF THE INVENTION

The present invention relates to a navigation system and a landmark highlighting method.

BACKGROUND OF THE INVENTION

In Patent document 1, when approaching and passing by a spot (facility or POI (point of interest)) assigned a landmark, a navigation system magnifies a map including the landmark to allow the user to recognize the landmark.

Patent document 1: JP-2003-097966 A

Landmarks are assigned by a genre such as stations, convenience stores, or supermarkets; therefore, any landmark included in the assigned genre is automatically displayed in a magnified image. This may interfere with a user who has no intention to visit the spot assigned the magnified landmark.

SUMMARY OF THE INVENTION

It is an object of the present invention to provide a navigation system and/or a landmark highlighting method to appropriately highlight a landmark assigned to a spot, e.g., which a user frequently visits. The landmark visually becomes more distinctive, which allows a user to easily recognize it.

According to an aspect of the present invention, a navigation system displaying in a display unit a map and a landmark assigned to a spot is provided as follows. A visits count storing unit is included to store (i) identification information of a landmark assigned to a spot and (ii) a visits count relative to the spot. A visits count update unit is included to update the visits count in the visits count storing unit when the spot is visited. A highlighting unit is included to (i) refer to the visits count storing unit when the spot is included in a map display range in the display unit and (ii) highlight the landmark when the visits count stored in the visits count storing unit is greater than a predetermined value. A visits count decrement unit is included to decrement the visits count stored in the visits count storing unit when a predetermined time period elapses.

According to another aspect of the present invention, a navigation system displaying in a display unit a map and a landmark assigned to a spot is provided as follows. A visits count storing unit is included to store (i) identification information of a landmark assigned to a spot and (ii) a visits count relative to the spot. A visits count update unit is included to update the visits count in the visits count storing unit when the spot is visited. A daily activity area defining unit is included to define a daily activity area. A highlighting unit is included to (i) refer to the visits count storing unit when the spot is included in a map display range in the display unit, (ii) highlight the landmark when the visits count stored in the visits count storing unit is greater than a first predetermined value when the spot is included in the daily activity area, and (iii) highlight the landmark when the visits count stored in the visits count storing unit is greater than a second predetermined value, which is smaller than the first predetermined value, when the spot is included in a not-daily activity area.

According to another aspect of the present invention, a landmark highlighting method is provided as follows. The method is used in a navigation system displaying in a display unit a map and a landmark assigned to a spot. The method includes: (i) storing identification information of a landmark assigned to a spot and a visits count relative to the spot; (ii) updating the stored visits count when the spot is visited; (iii) decrementing the stored visits count when a predetermined time period elapses; and (iv) referring to the stored visits count when the spot is included in a map display range in the display unit and then highlighting the landmark when the stored visits count is greater than a predetermined value.

According to another aspect of the present invention, a landmark highlighting method is provided as follows. The method is used in a navigation system displaying in a display unit a map and a landmark assigned to a spot. The method includes: (i) storing identification information of a landmark assigned to a spot and a visits count relative to the spot; (ii) updating the stored visits count when the spot is visited; (iii) defining a daily activity area; and (iv) referring to the stored visits count when the spot is included in a map display range in the display unit to highlight the landmark when the stored visits count is greater than a first predetermined value when the spot is included in the daily activity area and to highlight the landmark when the stored visits count is greater than a second predetermined value, which is smaller than the first predetermined value, when the spot is included in a not-daily activity area.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

FIRST EXAMPLE

Figure 1:
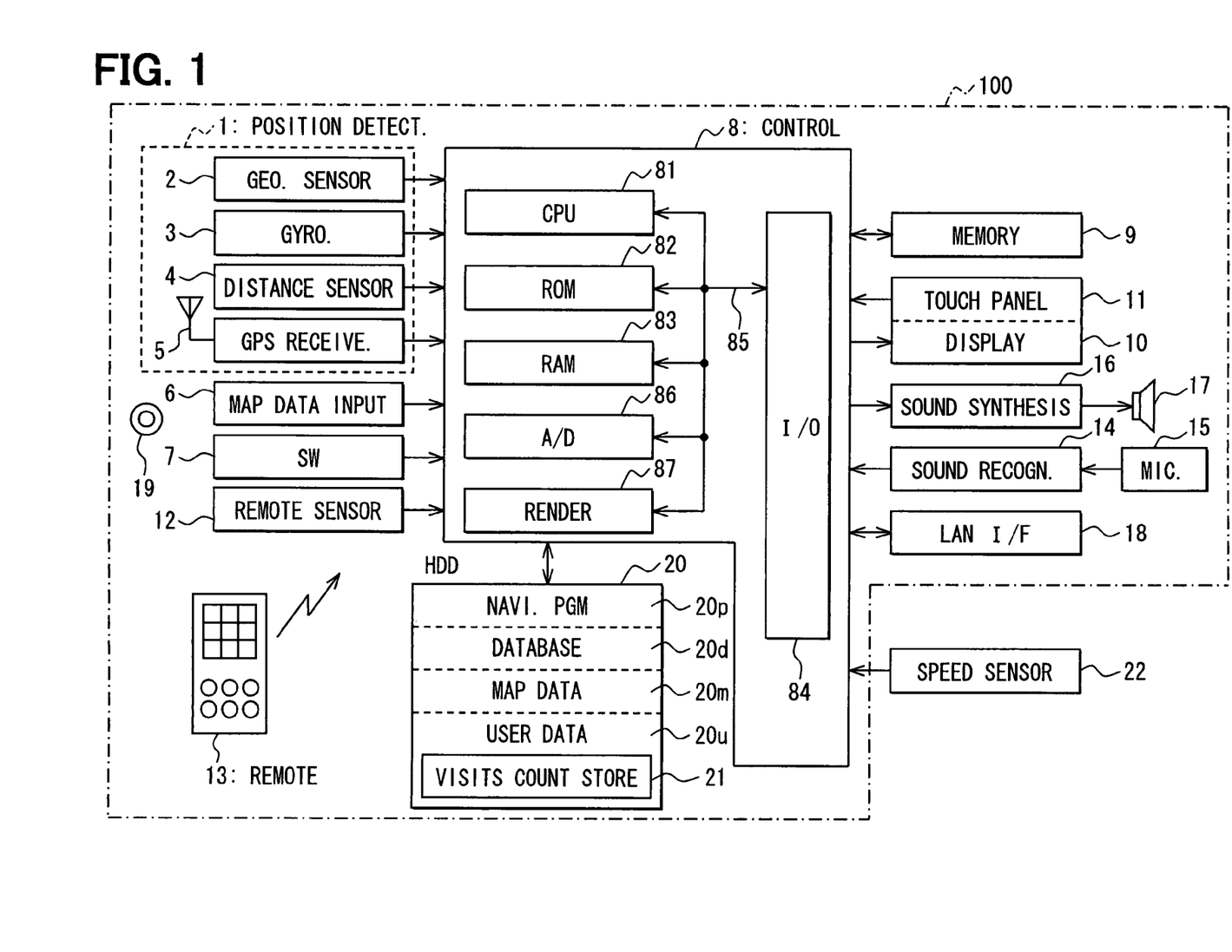
FIG. 1 shows a block diagram illustrating an overall structure of a navigation system as a first example of an embodiment according to the present invention.

FIG. 1 shows a block diagram illustrating an overall structure of a navigation system 100 as a first example of an embodiment according to the present invention. The navigation system 100 includes the following: a position detector 1, a map data input unit 6, an operation switch group 7, a control circuit 8, a non-volatile memory 9, a display unit 10, a touch panel 11, a remote sensor 12, a remote (or remote controller) 13, a sound recognition unit 14, a microphone 15, a sound synthesis circuit 16, a speaker 17, a local area network (LAN) interface (I/F) 18, a storage medium 19, and a hard disk drive (HDD) 20. Further, FIG. 1 shows a speed sensor 22 of a subject vehicle where the navigation system 100 is mounted.

The position detector 1 includes the following: a known geomagnetic sensor 2, a gyroscope 3 for detecting a rotational angle speed of the vehicle, a distance sensor 4 for detecting a traveled distance, and a global positioning system (GPS) receiver 5 for detecting a position of the vehicle based on radio waves from satellites, so as to compute absolute coordinates of a position of the vehicle. These sensors or the like 2, 3, 4, and 5 have individual types of detection errors; they are configured to supplement each other. Depending on required detection accuracies, the position detector 1 can be configured to be part of the sensors or the like 2, 3, 4 and 5. Further, a rotation sensor for a steering wheel, a wheel sensor for a following wheel, the speed sensor 22, or the like can be included.

The map data input unit 6 reads data from a storage medium 19 such as a compact disk-read only memory (CD-ROM) or digital versatile disk (DVD).

The operation switch group 7 uses, for instance, a touch panel 11 integrated into the display unit 10, or mechanical switches.

The control circuit 8 obtains map data surrounding absolute coordinates detected by the position detector 1, and displays on the display unit 10 a map and a current position of the vehicle; further, the control circuit 8 displays a landmark in normal display or highlight display. The control circuit 8 functions as means for updating a visits count and highlighting. The control circuit 8 is a usual computer including a known central processing unit (CPU) 81, read only memory (ROM) 82, random access memory (RAM) 83, an Input/output (I/O) 84, an analog/digital (A/D) converter 86, a rendering unit 87, and a bus line 85 connecting the foregoing components.

The CPU 81 performs controls based on a navigation program 20p stored in the HDD 20. The CPU 81 controls reading data from and writing data in the HDD 20.

The ROM 82 stores programs minimally necessary for starting the navigation system 100. The ROM 82 may store programs minimally necessary for operating a navigation function in the case for malfunction of the HDD 20.

The RAM 83 temporarily stores data or instructions when the CPU 81 executes or processes programs such as the navigation program 20p The A/D converter 86 includes a known A/D converter circuit to convert analog data, which is inputted from the position detector 1 or the like to the control circuit 8, to digital data, which can be processed by the CPU 81.

The rendering unit 87 generates display window data, which is displayed on the display unit 10 based on display data such as color data stored in the HDD 20.

The non-volatile memory 9 is rewritable semiconductor memory such as electrically erasable and programmable read only memory (EEPROM) or flash memory to store data necessary for operating the navigation system 100. The non-volatile memory 9 holds data stored therein even when an accessory switch of the vehicle turns off or the navigation system 100 turns off. Alternatively, the data necessary for operating the navigation system 100 can be stored in the HDD 20. Furthermore, the data necessary for operating the navigation system 100 can be divided into two parts, which are stored in the non-volatile memory 9 and HDD 20, separately.

The display unit 10 may be a known color liquid crystal display (LCD) unit to include a driver circuit (not shown) to control LCD or dot-matrix LCD. The driver circuit uses an active matrix drive method, where each pixel is provided with a transistor to certainly turn on/off a target pixel. The driver circuit further controls a display based on display window data and display instructions from the control circuit 8. The display unit 10 may be an organic electro luminescence (EL) display unit or plasma display unit.

The touch panel 11 is an input device installed on a display surface of the display unit 10 and transmits to the control circuit 8 a set of coordinates of a point, which a user touches. The touch panel 11 is installed on the screen of the display unit 10. The touch panel 11 has electric circuits, which are formed on a glass substrate and transparent film with a space therebetween, in an X axis direction and a Y axis direction. When a user touches a certain point on the film, wiring at the certain point short-circuits and changes a voltage value. Based on the changed voltage value, a set of coordinates (X, Y) can be detected. This method is called a resistance film method, which is typically used. Alternatively, another method such as an electro-static capacitance method can be used. The mechanical switches can be replaced with a pointing device such as a mouse or cursor.

The remote sensor 12 receives electric waves from the remote 13. The remote 13 includes several input buttons and transmits by wireless an instruction corresponding to the input button, which is operated by a user.

The sound recognition unit 14 processes sound signals inputted from the microphone 15 using a sound recognition technology such as the known hidden Markov model, and converts the processed results to a corresponding operation command.

The microphone 15 functioning as means for inputting sounds is used for a user to input various instructions via the sound recognition unit 14 to the control circuit 8.

The sound synthesis circuit 16 converts digital sound data, which is stored in the non-volatile memory 9 or HDD 20 by instructions of the navigation program 20p, to analog sound signals to output. A method for synthesizing sounds includes a record editing method, where sound waveforms themselves or encoded sound waveforms are accumulated and combined with each other as needed.

The speaker 17 is connected with the sound synthesis circuit 16 and outputs sounds or speeches based on analog sound signals from the sound synthesis circuit 16.

The LAN I/F 18 is an interface circuit to communicate data with other in-vehicle devices or sensors via an in-vehicle LAN (not shown). Further, the LAN I/F 18 may obtain data from the speed sensor 22 via the LAN I/F 18 or connect with an in-vehicle unit for an electronic toll collection system (ETC).

The storage medium 19 stores the navigation program 20a, a database 20d, map data 20m, or the like. Because of its data volume, the storage medium 19 is typically a CD-ROM or DVD; however, it can be a memory card. Further, data may be downloaded via an external network.

The HDD 20 stores the navigation program 20p, map matching data for enhancing position detection accuracy, and map data 20m including road data indicating road connections. The map data 20m stores map image information for display and road network information including link information and node information. The link information is for each road section, which constitutes a road, and includes position coordinates, distance, necessary travel time, road width, the number of lanes, and regulated speed. The link information includes data indicating whether a link is passable or not. The node information is for an intersection (or branch) and includes position coordinates, the number of lanes for right/left turn, and road links connected. Further, landmark information is included in the map data 20*m* to indicate stations, stores, gas stations, or the like and include landmark identification information (ID) unique to each landmark, genre information indicating genres such as stations or stores, and sets of longitudes and latitudes relative to spots (facilities or POIs (Points Of Interest)) to which the landmarks are assigned.

The HDD 20 stores entertainment information and auxiliary information for route guidance; the HDD further stores, as user data 20*u*, data a user inputs. The user data 20*u* can be updated with a speech input from the microphone or by an operation of the touch panel 11, remote 13, or operation switch group 7. The HDD 20 may store, as the database 20*d*, data necessary for operating the navigation system 100.

The navigation program 20*p*, database 20*d*, map data 20*m*, and user data 20*u* can be updated from the storage medium 19 via the map data input unit 6.

Figure 2:
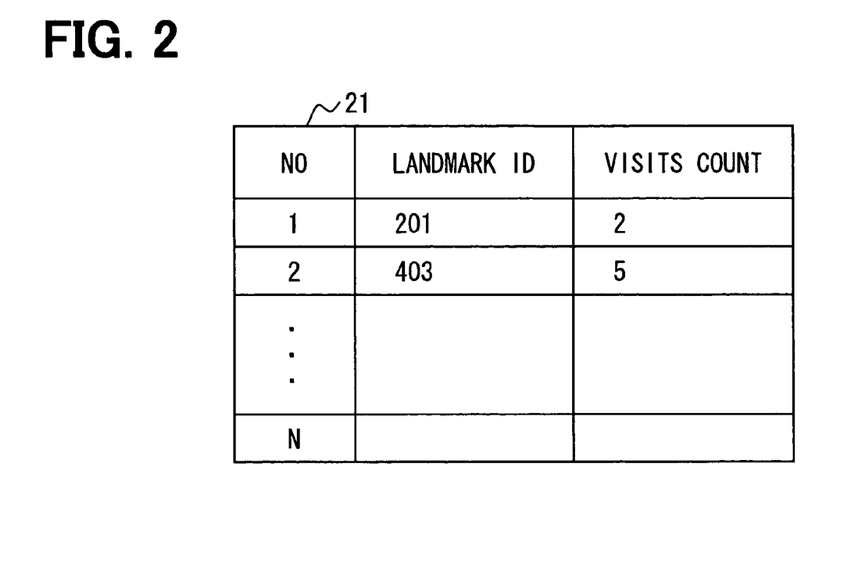
FIG. 2 shows a diagram illustrating a data structure of a visits count storing unit shown in FIG. 1.

The HDD 20 further includes, in the user data 20*u*, a visits count storing unit 21 for storing a visits count relative to a spot, to which a landmark is assigned. The visits count relative to a certain spot indicates the number of visits to the certain spot, or how many times the certain spot has been visited. The visits count storing unit 21 stores records of spots with landmarks the user or vehicle visited in the past. Each record of a spot assigned a landmark includes a record number, a landmark ID identifying the spot assigned the landmark, and a visits count relative to the spot, as shown in FIG. 2. Although the visits count storing unit 21 is included in the HDD 20 in the first example, it can be included in the non-volatile memory 9 instead.

The speed sensor 22 includes a known rotation detecting unit such as a rotary encoder and is installed in proximity to an attachment part for a wheel to detect rotations of the wheel and transmit it as pulse signals to the control circuit 8. The control circuit 8 converts the number of the wheel rotations into a vehicle speed and computes an estimated arrival time to a predetermined place from a current position of the vehicle or average speeds with respect to vehicle's travel sections.

The above structure allows the navigation system 100 to perform the following. The navigation program 20*p* is started by the CPU 81 of the control circuit 8. A user selects a route guide process from a menu displayed on the display unit 10 with an operation via the operation switch group 7, touch panel 11, or remote 13, or with a speech input via the microphone 15. Here, the route guide process allows a route towards a destination to appear on the display unit 10.

The user designates a destination by designating a point on the map, by using a facility or address retrieval, or by selecting a point from points previously registered by the user. The position detector 1 obtains a current position of the vehicle. Then an appropriate guide route from the current position to the destination is obtained. The guide route is overlaid over the road map on the display unit 10 to guide the user to the appropriate guide route. The Dijkstra method is one of known methods to automatically designate an ultimate guide route. Further, at least one of the display unit 10 and speaker 17 performs a guidance during operation, or a notice of a message according to an operating state.

Figure 3:
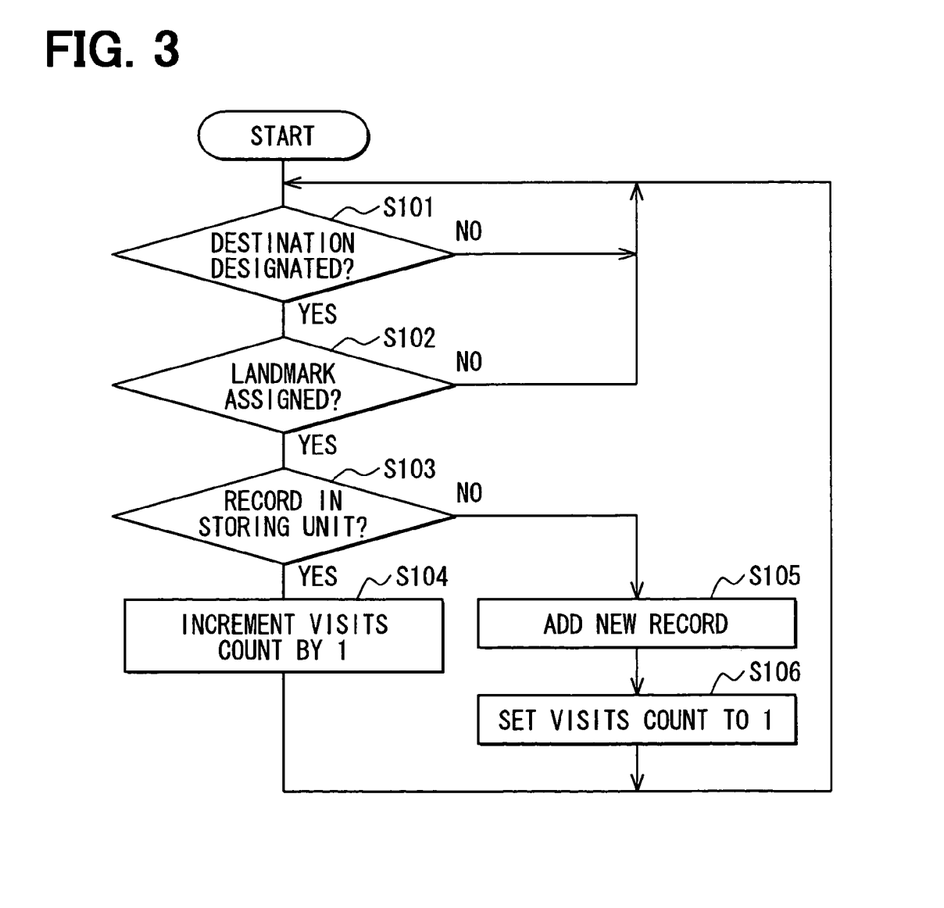
FIG. 3 shows a flowchart diagram illustrating a visits count update process in the first example.

FIG. 3 shows a flowchart diagram illustrating a visits count update process to update a visits count in the visits count storing unit 21. This process is included in the navigation program 20*p* and executed repeatedly along with other programs included in the navigation program 20*p*.

Figure 4:
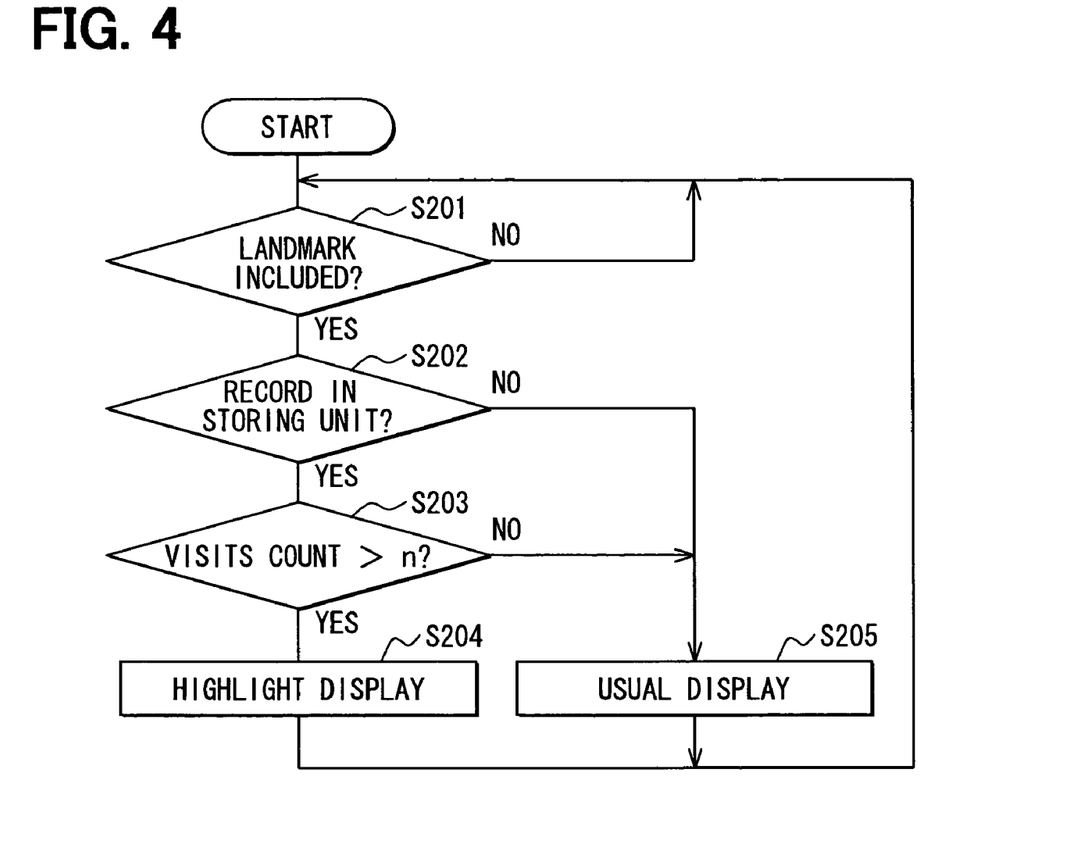
FIG. 4 shows a flowchart diagram illustrating a landmark display process in the first example.

FIG. 4 is a flowchart diagram illustrating a landmark display process to display a landmark on the display unit 10 based on the visits count stored in the visits count storing unit 21. This process is included in the navigation program 20*p* and executed repeatedly along with other programs included in the navigation program 20*p*.

Figure 5:
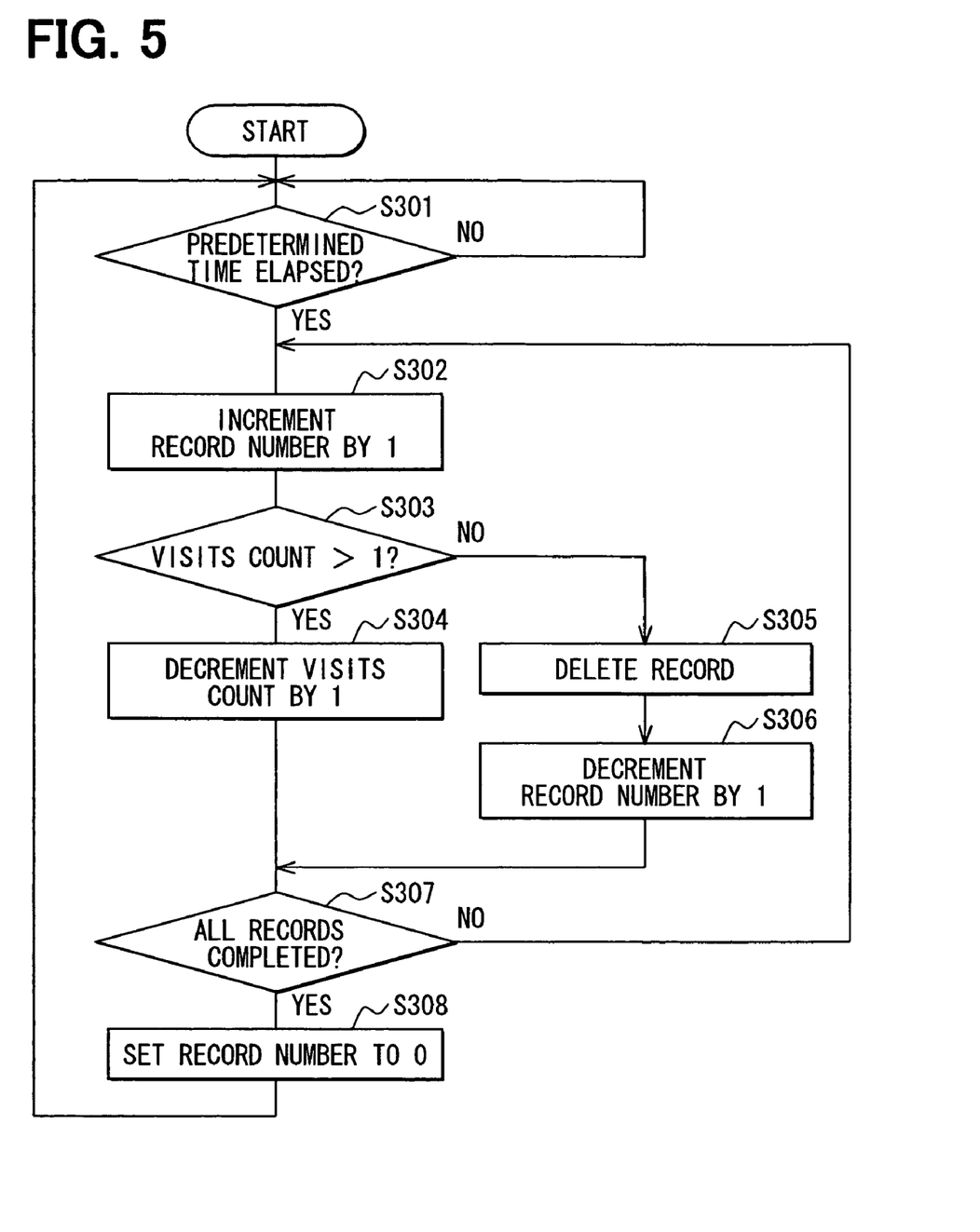
FIG. 5 shows a flowchart diagram illustrating a visits count decrement process in the first example.

FIG. 5 is a flowchart diagram illustrating a visits count decrement process to decrement the visits count stored in the visits count storing unit 21 as time elapses. This process is included in the navigation program 20*p* and executed repeatedly along with other programs included in the navigation program 20*p*.

Figure 6:
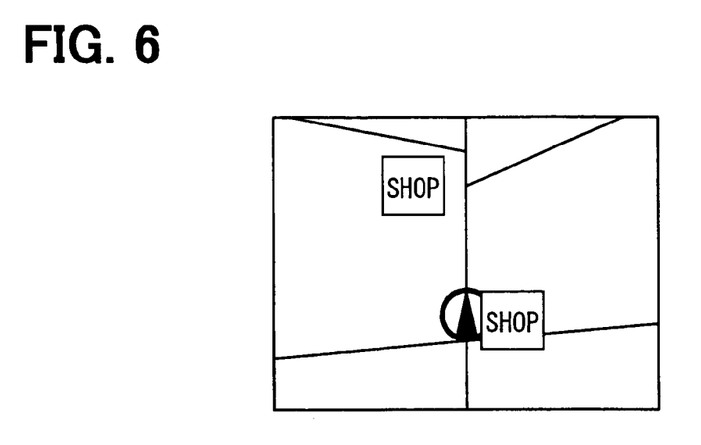
FIG. 6 shows an example of a usual display not to highlight a landmark in the first example.

FIG. 6 shows an example of a usual display not to highlight a landmark. Two shops are not highlighted in this example and displayed, e.g., in the same size as usual.

Figure 7:
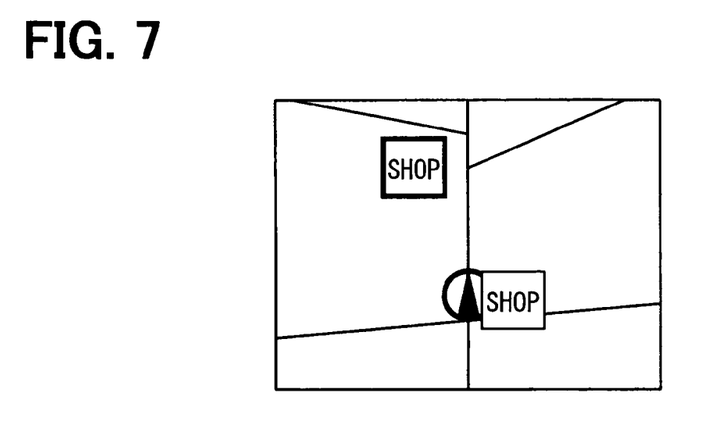
FIG. 7 shows an example of a highlight display to highlight a landmark in the first example.

FIG. 7 shows an example of a highlight display to highlight a landmark of a shop. In this example, one shop is displayed in a usual display; the other shop is displayed in a highlight display by broadening a peripheral line of an image of shop compared to the shop in the usual display.

Figure 8:
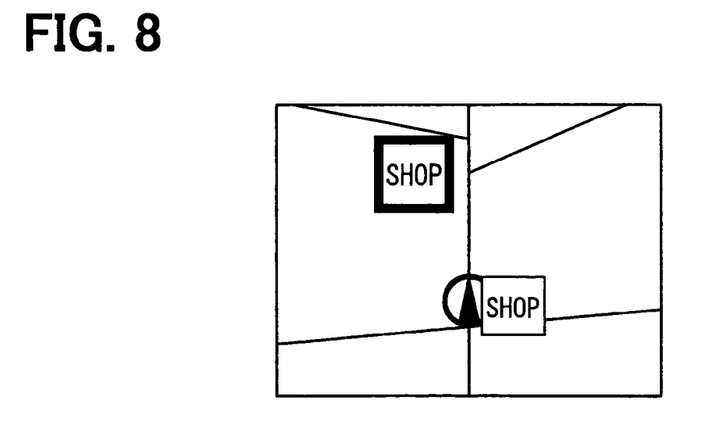
FIG. 8 shows another example of a highlight display to highlight a landmark in the first example.

FIG. 8 shows an example of a highlight display to highlight a landmark differently from that in FIG. 7. In this example, one shop is displayed in a usual display; the other shop is displayed in a highlight display by enlarging an entire image of shop compared to the shop in the usual display.

Although not specifically illustrated, a highlight display can be performed by changing a color, size, and/or brightness of a landmark.

Next, an operation of the navigation system 100 will be explained with reference to FIGS. 1 to 8.

The visits count update process will be explained with reference to FIG. 3.

The control circuit 8 observes or determines whether an operation for a destination designation is executed at Step S101.

When the determination at Step S101 is affirmed, the control circuit 8 refers to landmark information present within a 20-meter range of the map and determines whether a landmark display is included in the destination, i.e., whether the destination is assigned a landmark, at Step S102.

When the determination at Step S102 is affirmed, the control circuit 8 determines whether a record having a landmark ID of the corresponding landmark is memorized in the visits count storing unit 21.

When the determination at Step S103 is affirmed, it means that the corresponding landmark was designated as a destination in the past. The control circuit 8 then adds one (1) to the visits count (or increments the visits count by one (1)) in the record at Step S104.

When the determination at Step S103 is negated, it means that the corresponding landmark is designated as a destination for the first time. The control circuit 8 adds a new record having a landmark ID of the corresponding landmark at Step S105 and sets the visits count in the record to one (1) at Step S106.

In this example, the visits count is updated when the landmark is designated as a destination for a destination retrieval; instead, the visits count may be updated when a user actually reaches the landmark or the destination after following the guide route.

Next, the landmark display process will be explained with reference to FIG. 4.

The control circuit 8 observes or determines whether a landmark display is present within a map display range, i.e., whether a spot assigned a landmark is present within a map display range, at Step S201.

When the determination at Step S201 is affirmed, the control circuit 8 determines whether a record having a landmark ID of the corresponding landmark is stored or memorized in the visits count storing unit 21 at Step S202.

When the determination at Step S202 is affirmed, the control circuit 8 then determines whether the visits count is larger than a predetermined count n (e.g., n=three (3)) at Step S203.

When the determination at Step S203 is affirmed, the control circuit 8 then overlays the landmark on the map and highlights it at Step S204.

When the determination at Step S202 or determination at Step S203 is negated, the control circuit 8 then overlays the landmark on the map in a usual display (not to highlight) at Step S205.

Next, the visits count decrement process will be explained with reference to FIG. 5.

The control circuit 8 observes or determines whether a predetermined time period (e.g., one week, one month, or one year) has elapsed at Step S301.

When the determination at Step S301 is affirmed, the control circuit 8 increments a record number by one (1) at Step S302 and then determines whether the visits count of the record corresponding to the record number is larger than one (1) at Step S303.

When the visits count is larger than one (1) (S303: YES), the control circuit 8 subtracts one (1) from the visits count, i.e., decrements the visits count by one (1), at Step S304. When the visits count is not larger than one (1) (S303: NO), the control circuit 8 deletes the record from the visits count storing unit 21 at Step S305 and increments the record number by one (1) at Step S306. In this case, one vacant entry appears. This vacant entry is filled by decrementing, by one (1), the record numbers corresponding to entries following the vacant entry.

Next, the control circuit 8 determines whether all the records in the visits count storage unit 21 are processed at Step S307. When the determination at Step S307 is negated, the sequence returns to Step S302 and Steps S302 to S307 are repeatedly applied to the next record number.

When the determination at Step S307 is affirmed, the control circuit 8 resets the record number to zero (0) at Step S308. The sequence then returns to Step S301 to wait until the predetermined time period elapses.

In this example, a landmark assigned to a spot designated (or visited) as a destination in the past is highlighted on a map. A destination may be designated in a destination retrieval by directly touching a landmark in a display screen. In such a case, a landmark assigned to a spot frequently visited can be differentiated from other landmarks and easily selected.

Further, a possibility to re-visit a landmark visited in the past may decrease after a predetermined time period elapses. This can be reflected on the above-mentioned process.

SECOND EXAMPLE

Figure 9:
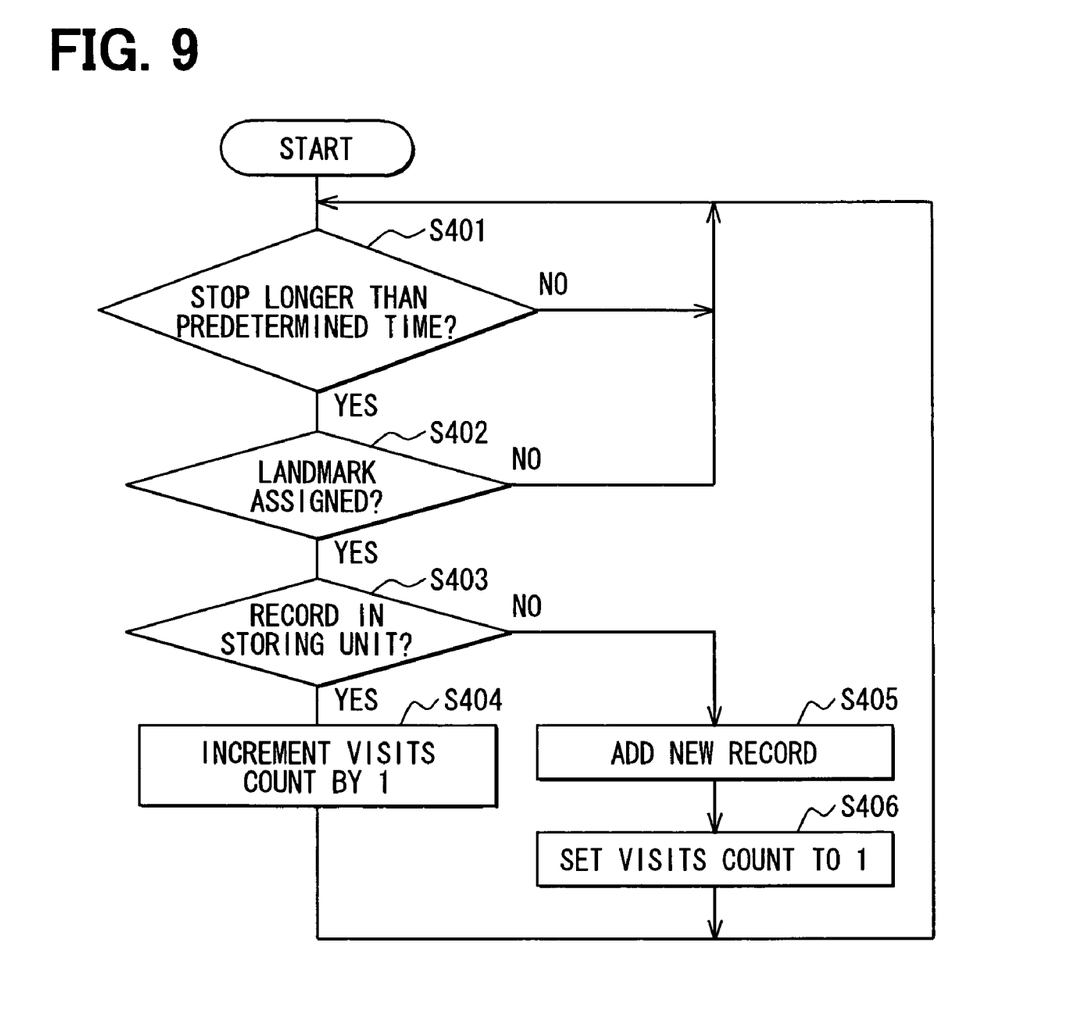
FIG. 9 shows a flowchart diagram illustrating a visits count update process in a second example.

FIG. 9 is a flowchart diagram illustrating a visits count update process in the navigation system 100 according to a second example. This process is included in the navigation program 20*p* and executed repeatedly along with other programs included in the navigation program 20*p*.

Parts to be not specifically described are similar to those in FIGS. 1 to 8 in the first example; detail explanation will be omitted.

The visits count update process according to the second example takes place as below.

The control circuit 8 observes or determines whether a subject vehicle in which the navigation system 100 is mounted has stopped longer than a predetermined time period at Step S401. This may be determined based on determining whether a speed signal from the speed sensor 22 indicates a speed of zero (0).

When the determination at Step S401 is affirmed, the control circuit 8 determines whether a landmark display is included in the corresponding location at Step S402.

When the determination at Step S402 is affirmed, the control circuit 8 determines whether a record having a landmark ID of the corresponding landmark is memorized in the visits count storing unit 21 at Step S403.

When the determination at Step S403 is affirmed, it means that the subject vehicle had stopped at the corresponding landmark longer than the predetermined time period. The control circuit 8 increments the visits count of the corresponding landmark by one (1) at Step S404.

When the determination at Step S403 is negated, it means that the subject vehicle stopped at the corresponding landmark longer than the predetermined time period for the first time. The control circuit 8 adds a new record having a landmark ID of the corresponding landmark at Step S405 and sets the visits count in the record to one (1) at Step S406.

In this example, similarly to the first example, a landmark having high possibility that the user re-visits it can be highlighted on a map. A destination may be designated using a destination retrieval. A user may be reminded about errands to need to visit a shop. In those cases, the landmark assigned to the shop is differentiated from other landmarks and can be easily selected in a shorter time.

THIRD EXAMPLE

A user may learn a position of or route to reach a landmark frequently visited; therefore, highlighting the landmark is hardly required. In contrast, highlighting a distant landmark not frequently visited is useful. For instance, a user easily learns a position of or route to reach a convenient store in a commuting route; highlighting it is not always necessary. In contrast, highlighting an amusement park or department store visited a year ago may help a user recognize it when the user intends to visit, it again.

Figure 10:
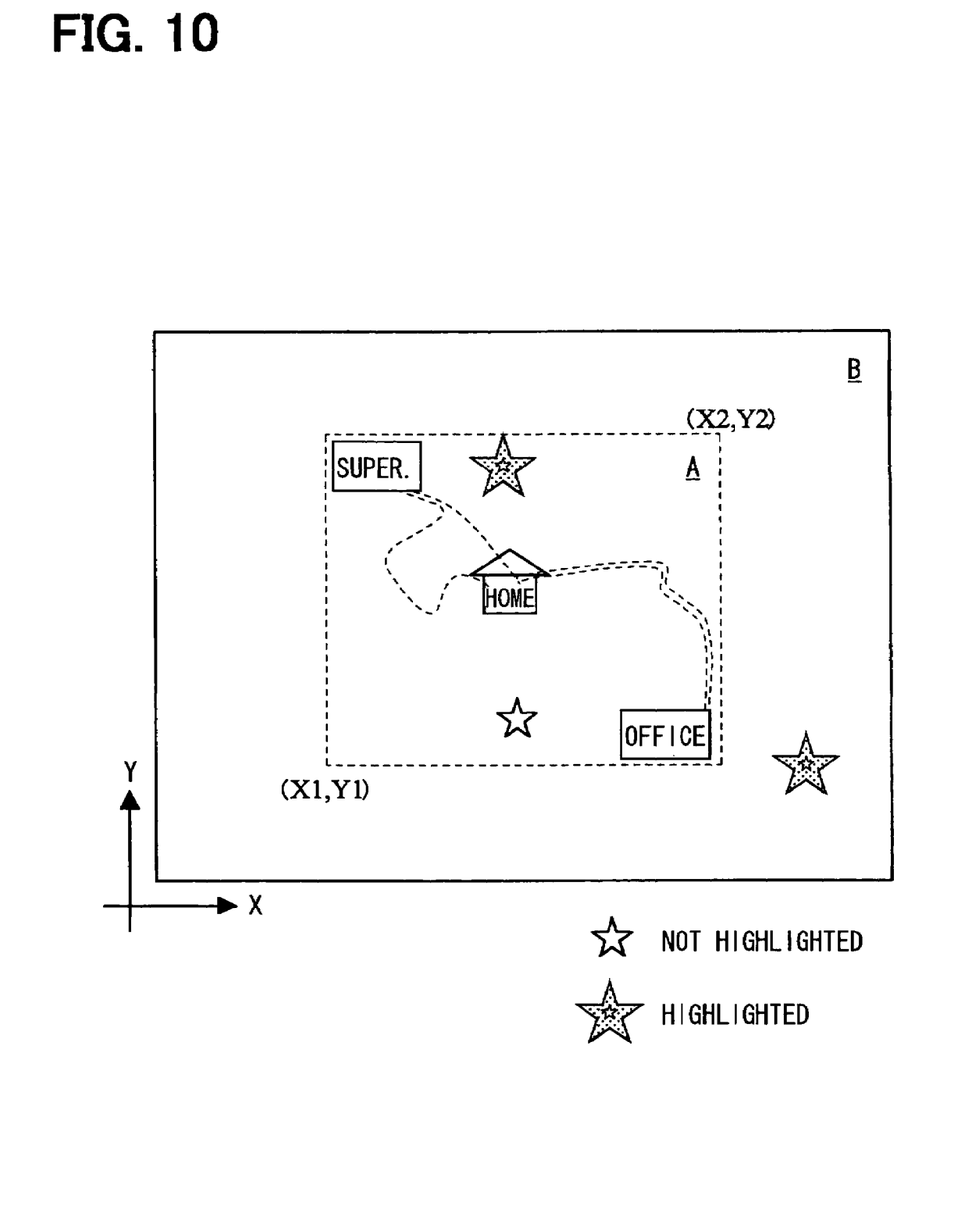
FIG. 10 shows an example of a highlight display to highlight a landmark in a third example.

In a third example, areas are classified into two categories, i.e., a daily activity area A and a not-daily activity area B; a criterion (predetermined visits count n) as to highlighting or not is differentiated between the daily activity area A (first visits count nA) and not-daily activity area B (second visits count nB). That is, a landmark in a daily activity area is highlighted when the visits count nA exceeds ten (10); a landmark in a not-daily activity area is highlighted when the visits count nB exceeds one (1).

Next, defining a daily activity area A will be explained with reference to FIG. 10. A daily activity area A is included within a rectangular coordinate range, which is defined by the minimum values (X1, Y1) of latitude and longitude and the maximum values (X2, Y2) of latitude and longitude, which are included in a range a subject vehicle visited for a predetermined time period (e.g., one week). A not-daily activity area B is outside of the daily activity area A, the rectangular coordinate range. Further, the minimum values (X1, Y1) are increased time-wise, e.g., by 10 seconds per day; the maximum values (X2, Y2) are decreased time-wise, e.g., by 10 seconds per day. That is, the daily activity area A is calculated to become smaller day by day. When the vehicle travels to get out of the daily activity area A, the minimum values (X1, Y1) or maximum values (X2, Y2) are updated based on the new activity area. Thus, a daily activity range of the vehicle can be defined as a daily activity area A.

Figure 11:
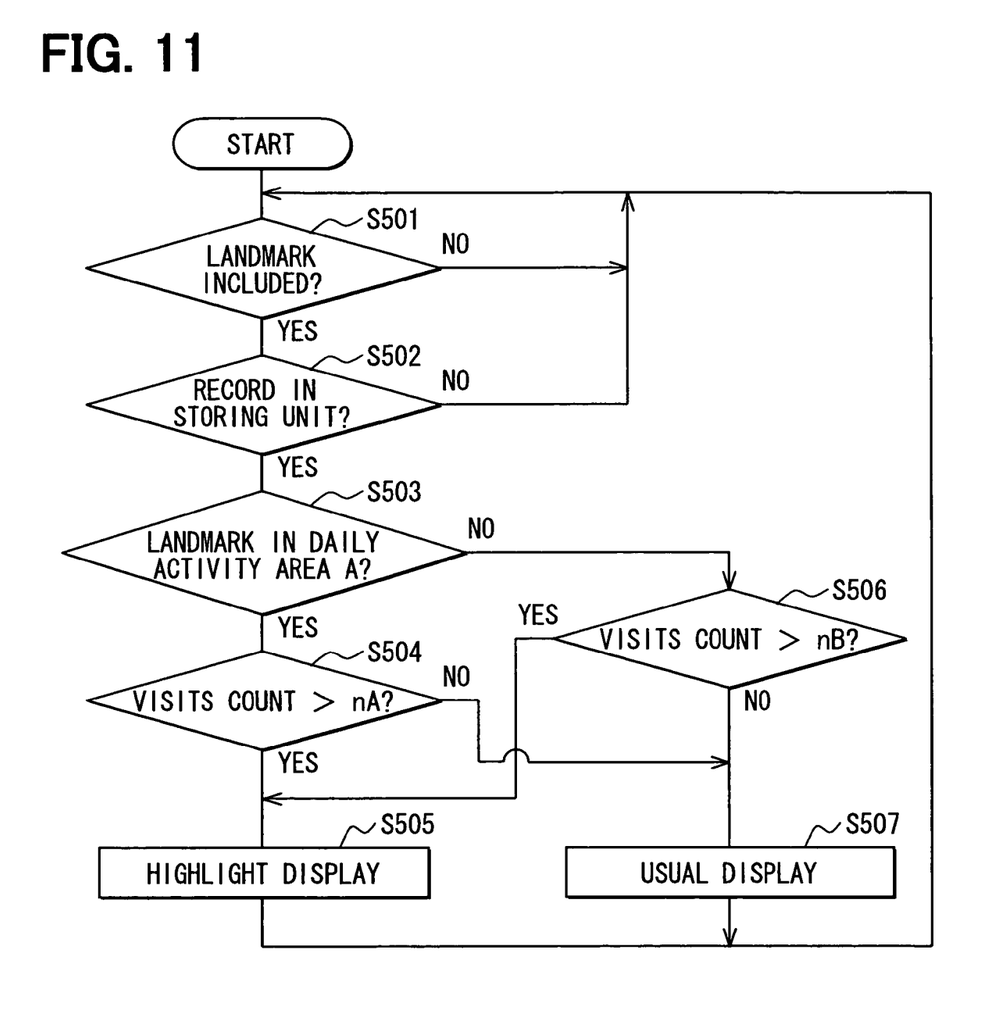
FIG. 11 shows a flowchart diagram illustrating a landmark display process in the third example.

FIG. 11 shows a flowchart diagram illustrating a landmark display process according to the third example. This process is included in the navigation program 20p and executed repeatedly along with other programs included in the navigation program 20p.

Parts to be not specifically described are similar to those in FIGS. 1 to 8 in the first example; detail explanation will be omitted.

The landmark display process according to the third example takes place as below.

The control circuit 8 observes or determines whether a landmark display is present within a map display range at Step S501.

When the determination at Step S501 is affirmed, the control circuit 8 determines whether a record having a landmark ID of the corresponding landmark is memorized in the visits count storing unit 21 at Step S502.

When the determination at Step S502 is affirmed, the control circuit 8 then whether the corresponding landmark is included in the daily activity area A at Step S503.

When the determination at Step S503 is affirmed, the control circuit 8 then determines whether the visits count is larger than a first predetermined count nA (e.g., nA=ten (10)) at Step S504.

When the determination at Step S504 is affirmed, the control circuit 8 then performs a highlight display to overlay a hatched star-shaped landmark (shown within A in FIG. 10) in the daily activity area A at Step S505.

In contrast, when the determination at Step S504 is negated, the control circuit 8 then performs a usual display to overlay a white star-shaped landmark (shown within A in FIG. 10) in the daily activity area A at Step S507.

In contrast, when the determination at Step S503 is negated, the control circuit 8 then determines whether the visits count is larger than a second predetermined count nB (e.g., nB=one (1)) at Step S506.

When the determination at Step S506 is affirmed, the control circuit 8 then performs a highlight display to overlay a hatched star-shaped landmark (shown outside A (in B) in a right lower portion of FIG. 10) in the not-daily activity area B at Step S505.

In contrast, when the determination at Step S506 is negated, the control circuit 8 then performs a usual display to overlay a white star-shaped landmark in the not-daily activity area B at Step S507. Here, in this example, since the second visits count nB is set to one (1) and, therefore, less than one is zero (0), no landmark appears in the not-daily activity area B as shown in FIG. 10.

Thus, the third example provides an advantage as follows: a landmark frequently visited is only highlighted in the daily activity area A; and a distance landmark visited even only once is appropriately highlighted in the not-daily activity area B.

In this example, a highlighting method is differentiated between the daily activity area A and not-daily activity area B by setting two different criteria of the first visits count nA and second visits count nB. However, it can be differentiated in another different method, e.g., a criterion linearly variable. For instance, a landmark may be highlighted using linearly varying display brightness based on a distance L from a center point of a daily activity area A.

(Modifications)

For instance, the present invention is adapted to the navigation system 100 mounted on a vehicle in the above examples; however, it can be also adapted to a handheld portable electronic apparatus such as a cellular phone, PDA (Personal Data Assistant), or a notebook computer.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A navigation system displaying in a display unit a map and a landmark assigned to a spot, the system comprising:
   a visits count storing unit that stores (i) identification information of a landmark assigned to a spot and (ii) a visits count relative to the spot;
   a visits count update unit that updates the visits count in the visits count storing unit when the spot is visited;
   a daily activity area defining unit that defines a daily activity area; and
   a highlighting unit that
      (i) refers to the visits count storing unit when the spot is included in a map display range in the display unit,
      (ii) highlights the landmark when the visits count stored in the visits count storing unit is greater than a first predetermined value when the spot is included in the daily activity area, and
      (iii) highlights the landmark when the visits count stored in the visits count storing unit is greater than a second predetermined value, which is smaller than the first predetermined value, when the spot is included in a not-daily activity area,
   wherein
   the daily activity area defining unit
      (i) memorizes a first minimum value and a first maximum value in latitude and a second minimum value and a second maximum value in longitude within an activity range undergone for a predetermined time period, and
      (ii) defines as a daily activity area a rectangular coordinate range defined by the first and second maximum values and the first and second minimum values.

2. A navigation system displaying in a display unit a map and a landmark assigned to a spot, the system comprising:
   a visits count storing unit that stores (i) identification information of a landmark assigned to a spot and (ii) a visits count relative to the spot;
   a visits count update unit that updates the visits count in the visits count storing unit when the spot is visited;
   a daily activity area defining unit that defines a daily activity area; and
   a highlighting unit that
      (i) refers to the visits count storing unit when the spot is included in a map display range in the display unit, (ii) highlights the landmark when the visits count stored in the visits count storing unit is greater than a first predetermined value when the spot is included in the daily activity area, and (iii) highlights the landmark when the visits count stored in the visits count storing unit is greater than a second predetermined value, which is smaller than the first predetermined value, when the spot is included in a not-daily activity area, wherein the daily activity area defining unit, (i) when a predetermined time period elapses, increases the first and second minimum values and decreases the first and second maximum values to thereby decrease the daily activity area, and (ii) when the system gets out of the daily activity area, updates the first and second minimum values and the first and second maximum values to thereby increase the daily activity area.

3. A landmark highlighting method used in a navigation system displaying in a display unit a map and a landmark assigned to a spot, the method comprising:

storing (i) identification information of a landmark assigned to a spot and (ii) a visits count relative to the spot;

updating the stored visits count when the spot is visited;

defining a daily activity area; and referring to the stored visits count when the spot is included in a map display range in the display unit (i) to highlight the landmark when the stored visits count is greater than a first predetermined value when the spot is included in the daily activity area, and (ii) to highlight the landmark when the stored visits count is greater than a second predetermined value, which is smaller than the first predetermined value, when the spot is included in a not-daily activity area, wherein when the daily activity area is defined, (i) a first minimum value and a first maximum value in latitude and a second minimum value and a second maximum value in longitude within an activity range undergone for a predetermined time period are memorized, and (ii) a rectangular coordinate range defined by the first and second maximum values and the first and second minimum values is defined as the daily activity area.

4. A landmark highlighting method used in a navigation system displaying in a display unit a map and a landmark assigned to a spot, the method comprising:

storing (i) identification information of a landmark assigned to a spot and (ii) a visits count relative to the spot;

updating the stored visits count when the spot is visited;

defining a daily activity area; and referring to the stored visits count when the spot is included in a map display range in the display unit (i) to highlight the landmark when the stored visits count is greater than a first predetermined value when the spot is included in the daily activity area, and (ii) to highlight the landmark when the stored visits count is greater than a second predetermined value, which is smaller than the first predetermined value, when the spot is included in a not-daily activity area, wherein (i) when a predetermined time period elapses, the first and second minimum values are increased and the first and second maximum values are decreased to thereby decrease the daily activity area, and (ii) when the system gets out of the daily activity area, the first and second minimum values and the first and second maximum values are updated to thereby increase the daily activity area.

* * * * *